United States Patent
Topp

[11] Patent Number: 6,134,661
[45] Date of Patent: Oct. 17, 2000

[54] COMPUTER NETWORK SECURITY DEVICE AND METHOD

[76] Inventor: William C. Topp, 351 Shoddy Hollow Rd., Otisville, N.Y. 10963-2821

[21] Appl. No.: 09/021,867
[22] Filed: Feb. 11, 1998
[51] Int. Cl.[7] .................................................. G06F 12/14
[52] U.S. Cl. ..................... 713/200; 713/201; 713/202; 380/4; 380/21; 380/25
[58] Field of Search .................................. 705/1; 380/21, 380/25; 382/209; 713/202, 201, 324, 200, 172

[56] References Cited

U.S. PATENT DOCUMENTS

| | | | |
|---|---|---|---|
| 5,309,506 | 5/1994 | Alexander | 379/93.02 |
| 5,351,296 | 9/1994 | Sullivan | 380/24 |
| 5,451,757 | 9/1995 | Heath, Jr. | 235/382 |
| 5,748,888 | 5/1998 | Angelo et al. | 713/200 |
| 5,771,354 | 6/1998 | Crawford | 709/229 |
| 5,892,900 | 4/1999 | Ginter et al. | 713/200 |
| 5,900,867 | 5/1999 | Schindler et al. | 345/327 |
| 5,920,477 | 7/1999 | Hoffberg et al. | |

*Primary Examiner*—James P. Trammell
*Assistant Examiner*—Cuong H. Nguyen
*Attorney, Agent, or Firm*—Dilworth & Barrese

[57] ABSTRACT

A keyboard which performs a password encryption function, i.e., converting a memorable (insecure) password which is typed on the keyboard, into a secure password which is used to gain access to a computer network system. A preferred embodiment of the present invention comprises a user designated keyboard having an activating module and an encrypting module, both of which are disposed within the keyboard. To gain access to a computer network, the user will press an activating key of the keyboard which sends an activating signal to the activator. The activating module will direct all subsequent keystroke signals (i.e. password) to the encrypting module, which performs an encrypting function and generates an encrypted password. When the user is finished typing the password, a deactivating key is pressed, which send the encrypted password to the computer network and which signals the activating module to divert (pass through) all subsequent keystroke signals.

17 Claims, 5 Drawing Sheets

COMPUTER NETWORK SECURITY DEVICE AND METHOD

FIELD OF THE INVENTION

The present invention relates to computer network security and, more particularly, to a method and apparatus for providing password encryption by a keyboard, whereby access to a computer network is obtained by the encrypted password.

BACKGROUND OF THE INVENTION

With the increasing concern over the security of sensitive data contained in their network systems, large corporations and the United States military have sought numerous techniques to combat the proliferation of network "hacking" and "cracking" which has plagued the networking community. Occasionally, hacking has caused damage to these entities resulting from the usurpation of highly confidential information, as well as the pilferation of money. While there are certain software and hardware "firewalls" that may be employed to prevent hackers from it obtaining access to computer networks from the outside, it is estimated that approximately 85% of such unauthorized tampering occurs from individuals on the corporate side of the "firewall," i.e., an individual with insider privileges.

Conventionally, passwords have been employed as the primary and often only defense against such unauthorized intrusion into a computer network. A password is a string of any combination of alphanumeric characters, with the maximum length of such password string being determined by the particular network system. Common network standards generally provide for passwords being at least eight characters in length and containing a mixture of lower and upper case letters and numbers. An authorized user of a given computer network system will not obtain access to such system until the user confirms his or her identity by entering a password that corresponds to that user's account identification (user ID), which is generally based on the name of the individual.

Although passwords generally provide adequate protection against breaches of network security, such protection may be compromised in several circumstances. First, if a hacker or an insider knows or steals an authorized user's account ID and password, no easily attainable level of network security could prevent access to the network in such a situation. This might occur when, for example, an authorized user, who has difficulty in remembering a complex, lengthy or otherwise random password (i.e., secure password), writes the password down somewhere, which is then intercepted or observed by an individual. This individual can then gain unauthorized access to the system.

Another example is when an authorized user selects a familiar or memorable password (e.g., a father's first name or significant word) which the user can easily remember. The problem with choosing such memorable passwords ("insecure passwords"), however, is that a hacker can easily obtain access to a system network by performing a standard "dictionary attack" on the system network. A "dictionary attack" involves utilizing a computer program to logon to the system with every word, phrase or name found in the dictionary until the proper password is found. These computer programs are easy to generate and are readily available from the Internet.

Such "dictionary attacks," however, can be effectively thwarted by choosing secure passwords (e.g., alphanumeric strings not present in any dictionary), which makes it very difficult, if not virtually impossible, for hackers to discover. An example of a secure password is one that is randomly generated, i.e., each individual character of the password is chosen, e.g., from among 62 possibilities (52 upper and lower case letters of the alphabet plus the 10 decimal numbers). Such secure passwords (i.e, randomly generated), however, are harder to remember, which ultimately results in a user choosing a memorable password that is readily ascertainable by an unscrupulous hacker. Further, notwithstanding that most security-conscious networks perform their own dictionary lookup before validating a new password and reject memorable passwords over secure passwords, users that are required to use secure passwords are inclined to write them down, which ultimately results in a potentially less secure network system than merely allowing users to utilize memorable passwords. The difficulty is compounded on systems that require passwords to be changed periodically, which results in a user having to frequently memorize a new secure password.

Accordingly, there is a strong need in the networking industry to provide a method and system that enables access to a computer network by utilizing a memorable password, but which method and system also provides the level of protection against unauthorized access to such networks afforded by a secure passwords (e.g., random and complex).

SUMMARY OF THE INVENTION

It is therefore an object of the present invention to remedy the problems associated with utilizing memorable (insecure) passwords to gain access to a computer network by providing a method and apparatus for generating a secure password through the encryption of a memorable password, whereby access to the computer network is obtained by processing the encrypted password (i.e., secure password).

In one aspect of the present invention, a method for providing security from unauthorized access to a computer network comprises the steps of: activating an encryption function of an encryption module; entering a password on a keyboard (or any other suitable keypad) to generate keystroke signals corresponding to the password; directing each of the keystroke signals to the encryption module; encrypting each of the keystroke signals to generate an encrypted password; deactivating the encrypting function; and processing the encrypted password, wherein access to the computer network is obtained by the encrypted password.

In a preferred embodiment of the present invention, the activating and encrypting functions are performed by hardware disposed within the keyboard. However, in another embodiment of the present invention, the activating and encrypting functions may be performed by hardware disposed within a separate module that is interposed in series between a keyboard and network system. In yet another embodiment of the present invention, the activating and encrypting functions may be performed in hardware contained on an encrypting key card which is inserted into a slot on the keyboard for receiving the card.

It is preferable, as explained in detail below, that the encryption function performed by the hardware in accordance with the present invention be unique for each authorized user of the network. This would make it virtually impossible for an unauthorized individual to decipher the encryption function and then convert a known memorable password into the secure password (i.e., encrypted password) so as to gain access to the network. Further, this would prevent an authorized user from gaining access to the network by entering his or her memorable password into the hardware module (e.g., keyboard) that is designated to another authorized user of the computer network system, unless, of course (as explained below), the encryption is contained on a removable key or key card which allows an authorized holder of such key card to access the network via any network keyboard designed to operate with these key cards.

These and other objects, features and advantages of the present invention will become apparent from the following detailed description of illustrative embodiments, which is to be read in connection with the accompanying drawings.

DETAILED DESCRIPTION OF PREFERRED EMBODIMENTS

Figure 1:
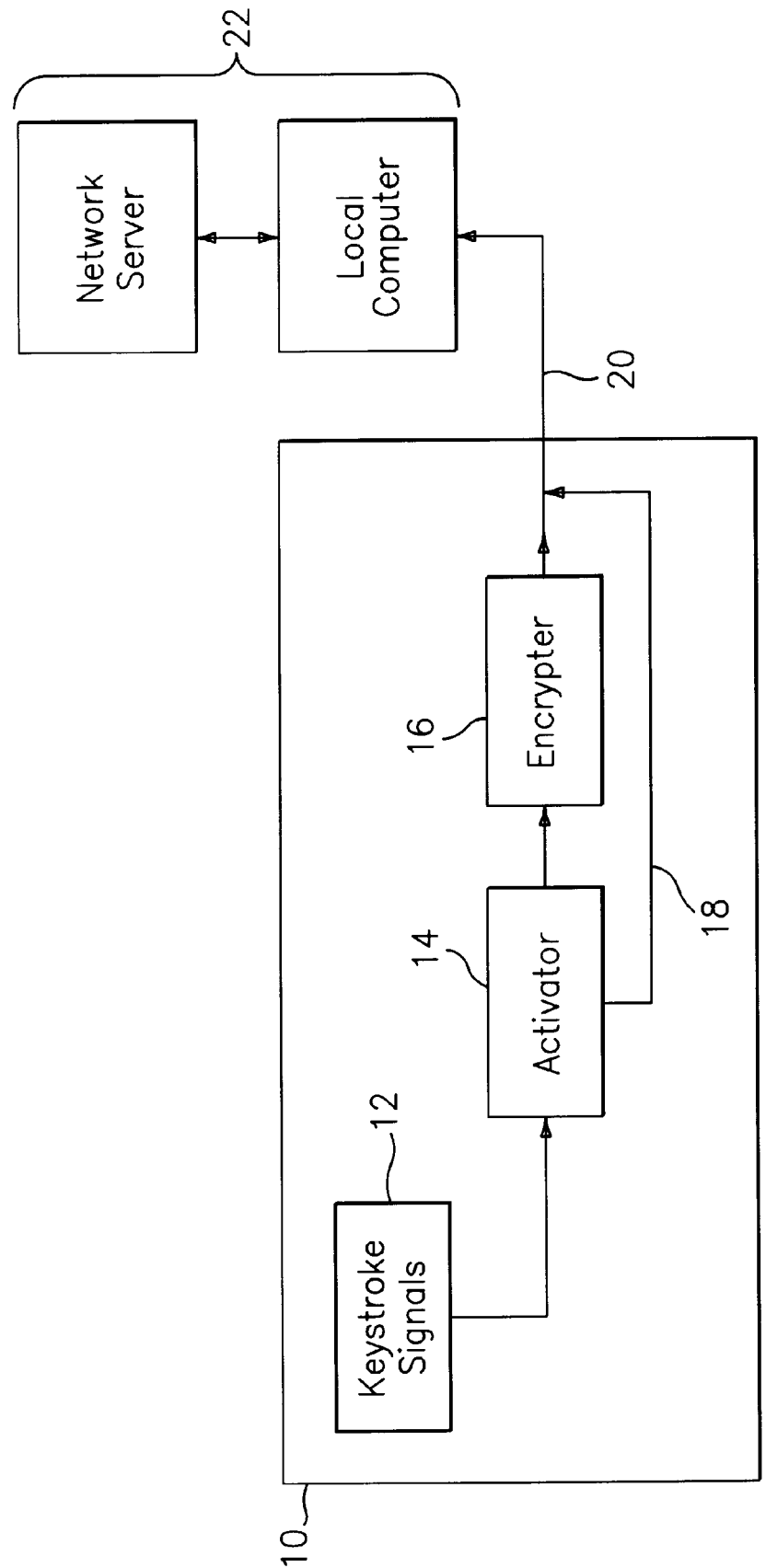
FIG. 1 is a block diagram illustrating the computer network security apparatus according to an embodiment of the present invention.

Referring to FIG. 1, a block diagram of components of a preferred embodiment of the present invention is shown. It is to be understood that the same or similar components illustrated throughout the figures are designated with the same reference numeral. The present invention provides a keyboard 10 which performs a password encryption function, i.e., converting a memorable (insecure) password, which is typed on the keyboard 10, into a secure password. Specifically, the keyboard 10 includes keys (not shown) for generating keystroke signals 12. An activator module 14, disposed within the keyboard 10, is responsive to the keystroke signals 12. An encrypter module 16, disposed within the keyboard 10 and operatively coupled to the activator module 14, receives certain keystroke signals 12 from the activator module 14. A bypass link 18, connected to the activator module 14 and a keyboard cord 20, diverts keystroke signals received by the activator module 14 away from the encrypter module 16. The keyboard 10 is connected to a computer network system 22 by the keyboard cord 20.

Figure 2:
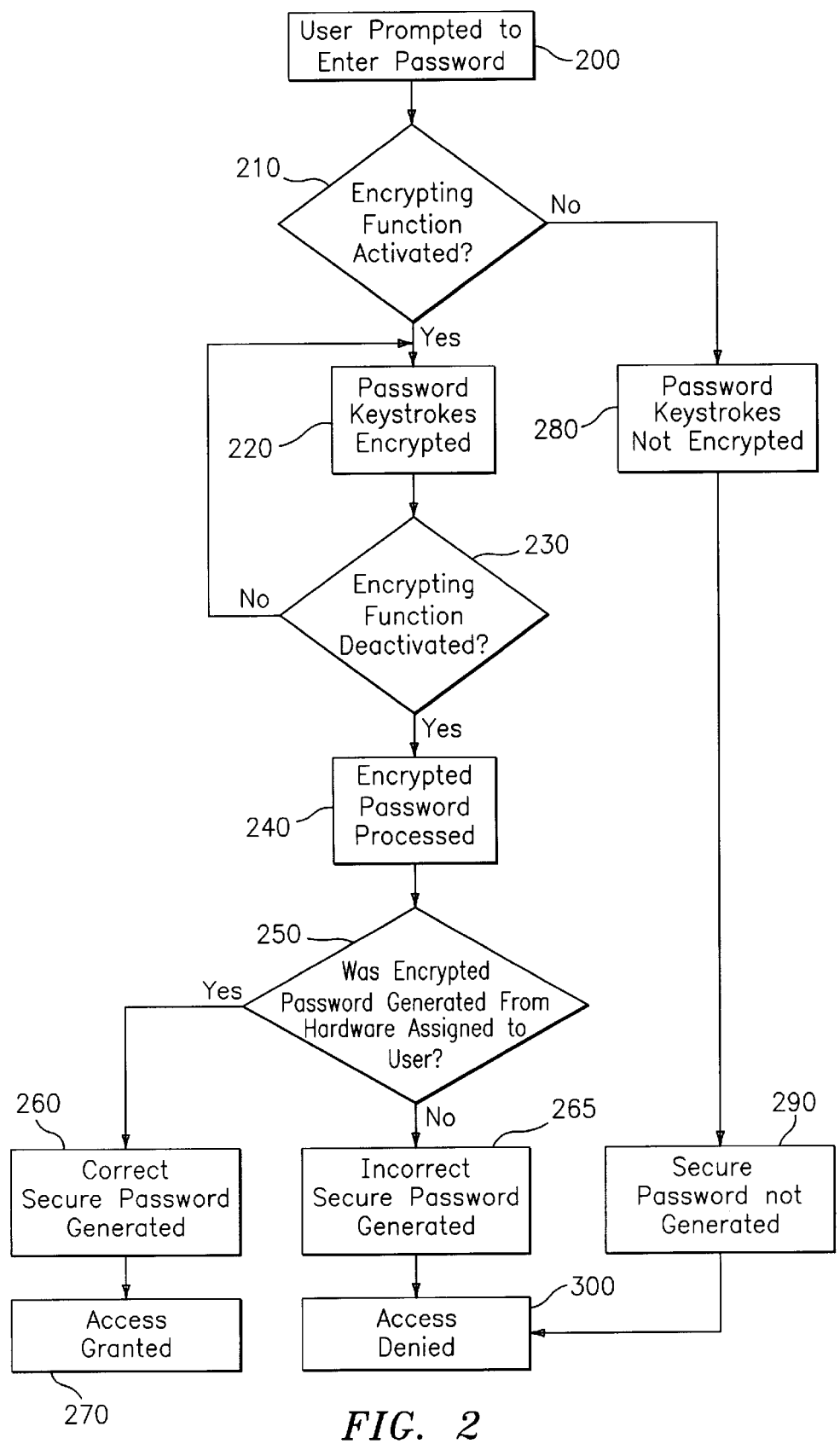
FIG. 2 is a flow diagram illustrating a password encryption method according to an embodiment of the present invention.

The operation of the present invention will now be described in detail with reference to FIGS. 1 and 2, wherein FIG. 2 is a flow diagram illustrating the password encrypting method according to an embodiment of the present invention. When a user attempts to logon to the computer network 22, the user is prompted to enter a password (step 200). Next, the user will activate the encrypting function by pressing either a dedicated key or switch (not shown), or a combination of existing keys (e.g., Alt-Shift-N) on the keyboard 10, which generates an "activating signal" (step 210). This signal is then received by the activator module 14, which causes the activator module 14 to direct all subsequent keystroke signals 12 to the encrypter module 16, wherein all subsequent keystrokes are encrypted by the encrypter module 16 (step 220). Specifically, as the user enters his or her memorable password, each keystroke signal (corresponding to each of the alphanumeric characters of the memorable password) is converted into an encrypted character in accordance with the encrypting function of the encrypter module 16. As each encrypted character is generated, it is transmitted from the keyboard 10 to the local computer of the network system 22 via the cord 20, wherein it is either displayed on a monitor as a hidden character (e.g., an asterisk) or not displayed at all, depending, on the system configuration.

When the user is finished typing his or her memorable password on keyboard 10, the user will then press another key (e.g., "Enter"), a combination of keys or a switch (not shown) to generate a "deactivating signal" (step 230) which is then received by the activator module 14. The "deactivating signal" causes the activator module 14 to direct all subsequent keystroke signals received by the activator module 14 to the bypass link 18, rather than to the encrypting module 16. Accordingly, all keystroke signals generated between the "activating" and "deactivating" signals (e.g., the memorable password signals) are encrypted, thereby resulting in an encrypted password which is then processed by the network system (step 240). It is to be understood that when "deactivated," the keyboard functions as any conventional keyboard. The keystroke signal generated by pressing the "enter" key is preferably utilized as the "deactivating" keystroke signal so that the encrypting deactivation process and the processing of the encrypted password may be performed by a single keystroke. Alternatively, the deactivating keystroke or combination of keystrokes (or switch) may first be actuated so as to deactivate the encrypting function, followed by the actuation of the "enter" key so as to begin the processing of the encrypted password.

Next, assuming that the keyboard on which the memorable password is typed contains hardware (i.e., encryption hardware) which is assigned to the user (step 250), the encrypted password (which is generated from the keystroke signals of the memorable password) will be the correct secure password which corresponds to the user's account (step 260). Consequently, after the network system 22 processes the secure password (step 240), the user will be granted access to the network (step 270). It is to be understood that the user does not actually know the secure password and, thus, cannot reveal it.

If, on the other hand, the user does not activate the encrypting function by pressing the appropriate key(s) to trigger the activator module 14 (step 210), the keystroke signals corresponding to the user's memorable password will not be encrypted (step 280). Consequently, the secure password will not be generated (step 290), and the user will be denied access to the network (step 300) since the network 22 will not recognize the user's memorable password as a valid password.

It is to be appreciated that the present invention provides an inexpensive and effective solution to the problems associated with memorable (insecure) passwords without compromising network security. As demonstrated above, the present invention allows a user to gain access to a network by utilizing a memorable password, thus obviating the burden of utilizing more secure or random passwords which users frequently forget, resulting in high system overhead by the frequent cancellation and reissuing of new accounts and/or the usurpation of such passwords when they are written down.

Figure 3:
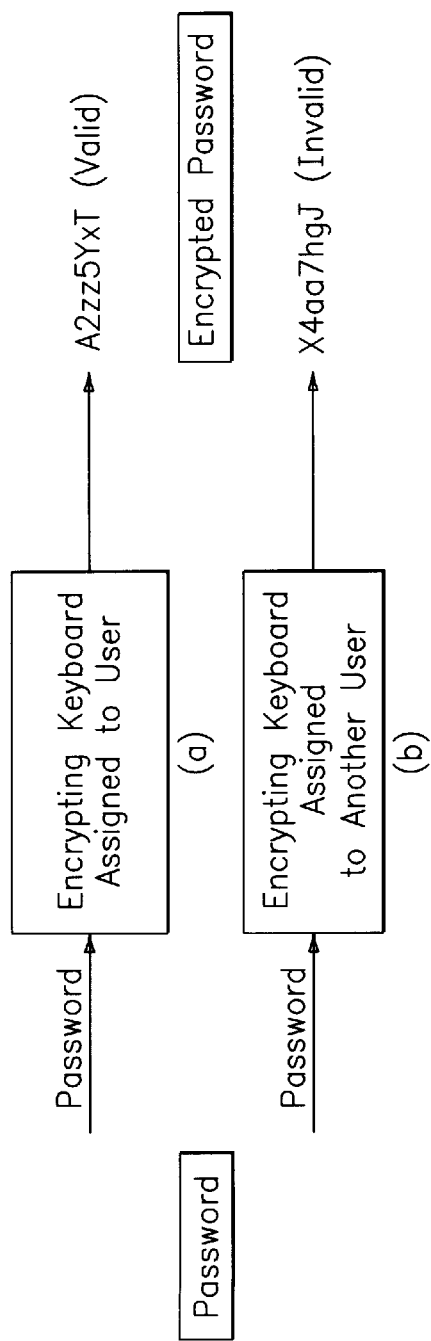
FIGS. 3a and 3b are block diagrams illustrating an encrypting function according to an embodiment of the present invention.

It is to be further appreciated that, since the present invention provides that the encrypting function for each keyboard in a given network system be unique (i.e., perform different encrypting functions), the only way the user can gain access to the network is by typing his or her memorable password on his or her own (i.e., assigned) keyboard. By way of example, referring to FIGS. 2 and 3a, assume the user chooses the word "PASSWORD" as his or her memorable password. By typing "PASSWORD" on the encrypting keyboard having encrypting hardware which is assigned to that user (step 250), the correct secure password, e.g. "A2zz5YxT," would be generated (step 260). As stated above, this secure password would then be recognized by the network as the correct secure password for that user and allow access (step 270). Of course, if the user inadvertently inputs the wrong memorable password on his or her dedicated keyboard, the use user attempts to gain access to the network by typing "PASSWORD" on an encrypting keyboard having encrypting hardware which is assigned to another authorized user (step 250), an encrypted password, e.g. "X4aa7hgJ," would be generated. As such, the encrypted password would not be recognized by the network as the correct secure password (step 265) for that user. Consequently, the user would be denied access to the network (step 300). Therefore, even if a hacker or insider had knowledge of another user's account and memorable password, the hacker or insider would be unable to access the computer network by typing the memorable password into another keyboard terminal of the c network system since such keyboard terminal would generate a different encrypted (i.e., secure) password. This makes it much harder for a user to willfully compromise network security by selling or giving a password to an unauthorized user.

It is to be understood that authorized users who require access to the network from more than one terminal site may be assigned various keyboards with identical encrypting functions, which can then be placed at such sites. Alternatively, the network system may be configured to accept more than one secure password for access to a single user account, thereby allowing the user to utilize a single memorable password with different keyboards. Further, power users, who are capable of remembering secure passwords, may gain access to the network from any location (i.e., keyboard). Such individuals would not activate their keyboard encryption function before entering their password.

Figure 4:
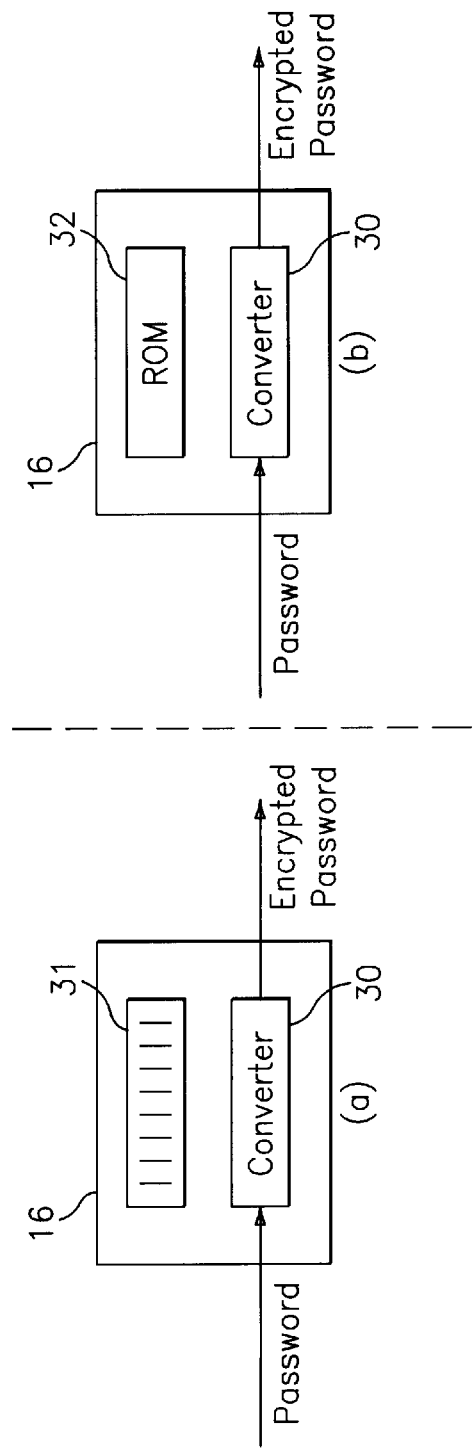
FIGS. 4a and 4b are block diagrams illustrating components for providing encryption functions according to an embodiment of the present invention.

It is to be appreciated that to provide added security, the encrypting function employed by the present invention is preferably unique for each keyboard 10 associated with the network system. Referring to FIG. 4a, the unique encrypting functions for each keyboard may be obtained several ways. For instance, the encrypter module 16 may include a DIP switch 31 (which is preferably inaccessible) having 8 or 16 settings, which can generate up to 256 and 65,536 different encrypting functions, respectively, from a single base encrypting hardware. Further, a converter 30, operatively connected to the DIP switch 31, encrypts the password keystroke signals to generate an encrypted password in accordance with the encrypting function (i.e., according the setting of the DIP switch 31). Alternatively, referring to FIG. 4b, the various encrypting functions may be programmed (via a lookup table) into a ROM (read only memory) within the encrypting module 16, which contains the unique code by which converter 30 performs the corresponding encrypting function to generate the required secure password. In this embodiment, each lookup table should be unique.

By utilizing unique encrypting functions, the present invention makes it virtually impossible for a hacker to decipher the encrypting function and then gain access by entering a series of keystrokes on any keyboard corresponding to the encrypted password. Further, because the encrypting function is performed in hardware contained within the keyboard, the keyboard may be configured as a oneway I/O device for purposes of preventing an outside hacker to access any particular encrypting function through the network by probing the keyboard (via the computer) during initialization or operation.

This is to be contrasted with the situation where the encrypting function is performed by software loaded in a network system or a local computer. Such a program may be usurped by anyone gaining access to either the network system or the local computer on which such program is stored. This would result in an even worse breach of security than the theft of a single password, since the hacker would be able to use the program to decipher each subsequent password assigned to a user to gain unauthorized access to the network system without even leaving evidence of this occurrence. By contrast, if the encrypting hardware of the present invention was stolen (or lost), the user would notice the theft (or loss) and quickly cancel his or her account. Moreover, if the keyboard breaks, it may simply be replaced. Therefore, to the network, a lost, stolen or broken keyboard is functionally equivalent to the user forgetting his or her password, and may be dealt with accordingly.

Figure 5:
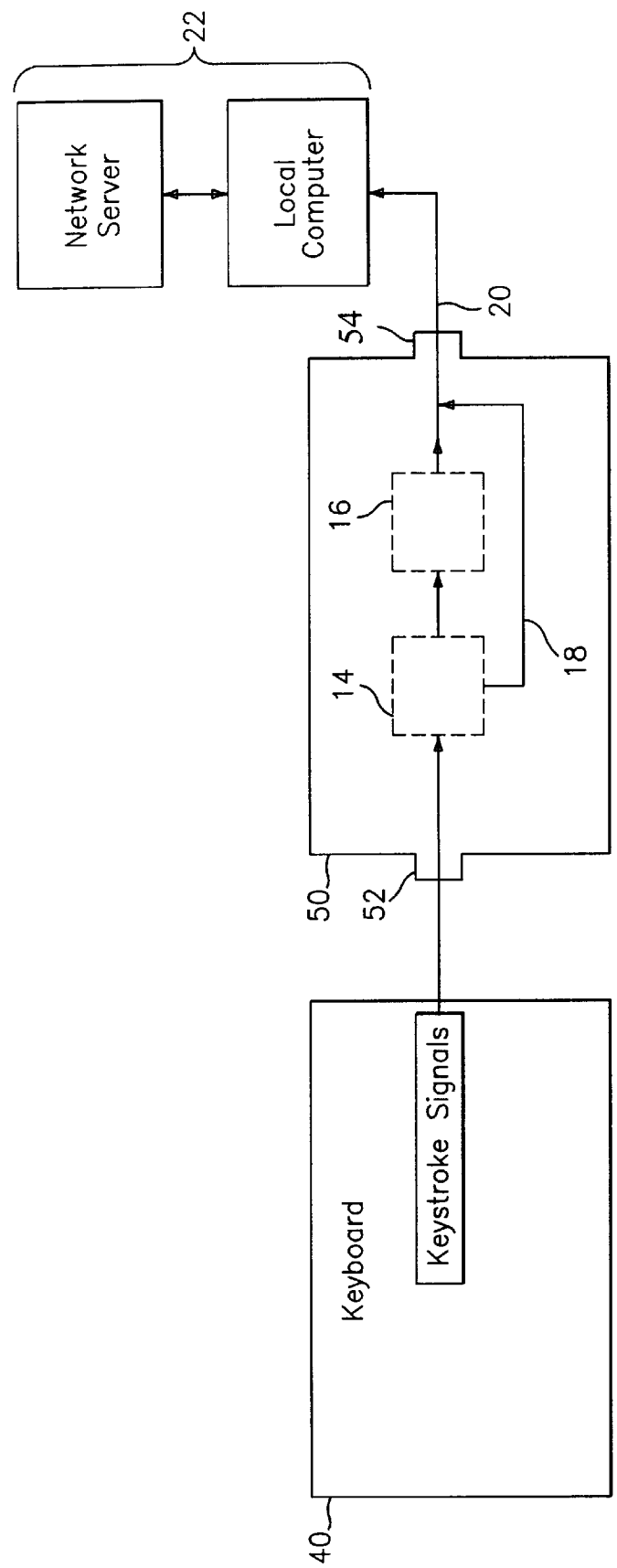
FIG. 5 is a block diagram illustrating the computer network security apparatus according to another embodiment of the present invention.

Different embodiments may be employed for the location and implementation of the encrypting hardware of the present invention. Referring now to FIG. 5, in another embodiment of the present invention, the encrypting function can be performed by an in-line encrypting module 50, having an input terminal 52 and an output terminal 54, with the input terminal 52 being connected to a standard keyboard 40 and the output terminal 54 being connected to the computer network 22. The in-line encrypting module 50 preferably performs the same encrypting functions as the encrypting keyboard 10 of FIG. 1. The encrypting function of the in-line encrypting module 50 is preferably activated and deactivated by actuating a pre-determined keystroke (or series of keystrokes), whereby the encrypting module 14 encrypts all keystrokes (i.e., password) between the activating and deactivating signals, as discussed above. Alternatively, the activating and deactivating signals may otherwise be generated by operating a switch (not shown) or pressing a key (also not shown) on the in-line encrypting module 50. When the encrypting function is deactivated, all keystroke signals from keyboard 40 would pass through the in-line encrypting module 50 through by-pass link 18 without being encrypted by encrypter module 16.

Figure 6:
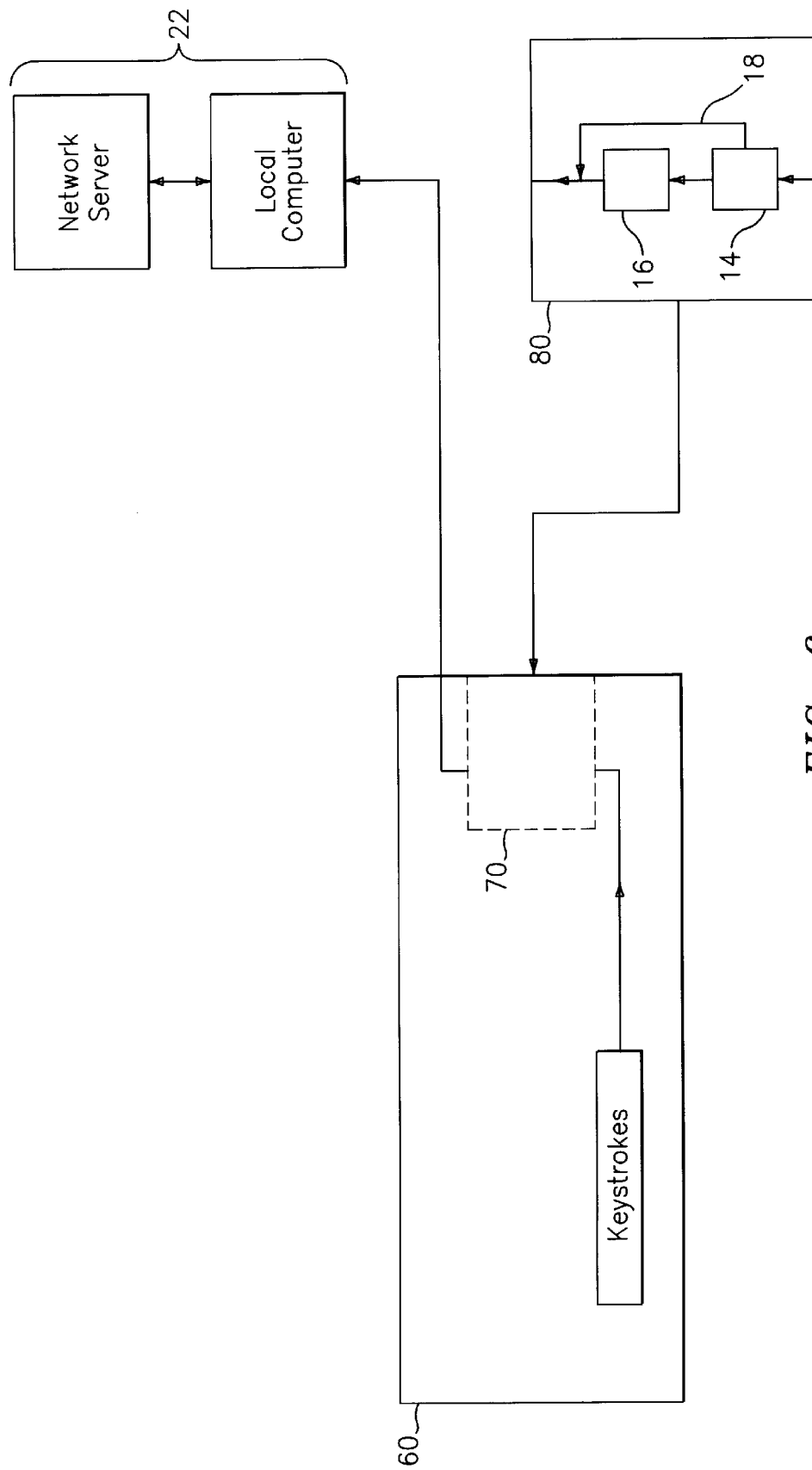
FIG. 6 is a block diagram illustrating the computer network security apparatus according to a further embodiment of the present invention.

Referring now to FIG. 6, in a further embodiment of the present invention, the encrypting function may be performed on a "key card" 80, which is inserted into a slot 70 of an encrypting keyboard 60. Together, the key card 80 and the keyboard 60 create a unique encrypting function with the unique aspects being disposed on the key- card 80. It is to be appreciated by one of ordinary skill in the art that the hardware configuration of the key card 80 may be similar to that of the encrypting keyboard 10 and the encrypting module 50, as shown in FIGS. 1 and 5, respectively. Alternatively, the key card 80 may function in a manner similar to that of the DIP switch 31, whereby the key card 80 may open and close eight (or sixteen) circuits to module a constant encryption. In this embodiment, all encrypting keyboards would preferably be identical, thereby enabling a key card user to access the network from any key encryption enabled keyboard 60 associated with the network. Alternatively, it is to be appreciated that the system may be configured such that certain key cards may only work with certain keyboards, thereby restricting access to certain sites.

It is to be understood that the functional modules described herein in accordance with the present invention are preferably implemented in hardware, firmware, or a combination thereof. It is to be understood by one of ordinary skill in the art that because the components of the invention described herein are preferably implemented in hardware, the actual connections shown in the figures may differ depending upon the manner in which the invention is designed. For example, the bypass link 18 illustrated in FIGS. 1, 5 and 6 represents either an actual construction of the encrypting hardware or symbolically represents that the keyboard signals are not encrypted when the encrypting hardware is deactivated. Specifically, one of ordinary skill can appreciate that when deactivated, the encrypting module may just pass the keyboard signals through the encrypting module without encrypting such signals (i.e., the bypass link 18 is disposed within the encrypter module 16). Further, with regard to the encrypting functions of the key card 80 as illustrated in FIG. 6, it is to be appreciated that the present invention can be configured such that the key card 80 may contain certain microinstructions (software or firmware) which would cause the encrypting keyboard 60 to generate an encrypted password via encrypting hardware disposed within the keyboard 60.

It is to be further understood that the encrypting functions of the present invention are in no way limited to password encryption. As such, one of ordinary skill in the art may envision various types of information (to be input into a computer) which may be encrypted in accordance with the teachings of the present invention herein.

Although the illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. An apparatus for providing security from unauthorized access to a computer network, comprising:

encrypting means for encrypting a series of keystroke signals representative of a user generated from a computer keyboard;

activating means, operatively coupled to said encrypting means, for directing said series of keystroke signals to said encrypting means to encrypt said series of keystroke signals after said activating means is activated;

deactivating means, operatively coupled to said activating means, for deactivating said activating means, said activating means diverting subsequent keystroke signals away from said encrypting means after being deactivated.

2. The apparatus of claim 1, wherein said activating means is activated by a dedicated key on said keyboard.

3. The apparatus of claim 1, wherein said activating means is activated by a combination of keys on said keyboard.

4. The apparatus of claim 1, wherein said deactivating means comprises a dedicated key on said keyboard.

5. The apparatus of claim 1, wherein said deactivating means comprises a combination of keys on said keyboard.

6. The apparatus of claim 1, wherein said encrypting means performs a user specific encrypting function.

7. The apparatus of claim 1, wherein said activating means and said encrypting means are disposed within said keyboard.

8. The apparatus of claim 7, wherein said encrypting means performs a user specific encrypting function.

9. The apparatus of claim 1, wherein said activating and encrypting means are disposed within a housing having an input terminal connected to said keyboard and an output terminal connected to said computer network.

10. The apparatus of claim 9, wherein said activating means is activated by a dedicated key on said keyboard.

11. The apparatus of claim 9, wherein said activating means is activated by a combination of keys on said keyboard.

12. The apparatus of claim 9, wherein said encrypting means performs a user specific encrypting function.

13. The apparatus of claim 9, wherein said activating means comprises switch disposed on said housing.

14. The apparatus of claim 1, further comprising:

a key card containing said activating means and said encrypting means; and a computer keyboard having a slot for receiving said key card.

15. The apparatus of claim 14, wherein said encrypting means performs a user specific encrypting function.

16. A method for providing security from unauthorized access to a computer network, comprising the steps of:

activating an encryption function of an encryption module;

entering a password on a keyboard to generate keystroke signals corresponding to said password;

directing each of said keystroke signals to said encryption module;

encrypting each of said keystroke signals to generate an encrypted password;

deactivating said encrypting function of the encryption module, wherein subsequent keystroke signals are diverted away from said encryption module after being deactivated; and processing said encrypted password, wherein access to the computer network is obtained by said encrypted password.

17. An encrypting device, having an input terminal and an output terminal, for providing computer network security, comprising:

an activator module, connected to said input terminal, for receiving signals from a computer keyboard, said activator module being responsive to an activating signal and a deactivating signal from said computer keyboard;

an encrypter module, operatively coupled to said activator module and connected to said output terminal, wherein said activating signal causes said activator module to direct a series of keystroke signals corresponding to a user password to said encrypter module to convert said series of keystroke signals into an encrypted password, and wherein said deactivating keystroke signal causes said encrypted password to be sent through said output terminal to said computer network and causes said activator module to divert subsequent keystroke signals away from said encrypter module.

* * * * *